United States Patent Office 2,783,247
Patented Feb. 26, 1957

2,783,247

INTERMEDIATES FOR THE PREPARATION OF 3,3-DIMETHYL-2,5 - DIOXO - PYRROLIDINE-4-PROPIONIC ACID COMPOUNDS AND PROCESS

Frederick A. Kuehl, Jr., Rumson, and Clifford H. Shunk, Scotch Plains, N. J., assignors to Merck & Co., Inc., Rahway, N. J., a corporation of New Jersey No Drawing. Application November 24, 1954,
Serial No. 471,123

13 Claims. (Cl. 260—343.6)

This invention is concerned with novel pyrrolidine compounds and with processes of preparing them. More particularly, it relates to 3,3-dimethyl-2,5-dioxo-pyrrolidine-4-propionic acids, to esters, amides and lactones thereof, and to processes for making these compounds starting with 4-methylpentane-1,3,4-tricarboxylic acid compounds. These 3,3-dimethyl-2,5-pyrrolidine propionic acid compounds and, in particular, the 3,3-dimethyl-2,5-dioxo-pyrrolidine-4-propionic lactones, esters and amides have analgesic and antipyretic activity. They are also valuable as intermediates in the preparation of the corresponding 3,3-dimethyl - 4,5 - dialkyl-dehydropyrrolidine-4-propionamides utilizable as components of fermentation mediums in the microbiological production of vitamin $B_{12}$.

These novel 3,3-dimethyl-2,5-dioxo-pyrrolidine-4-propionic acid compounds may be chemically represented as follows:

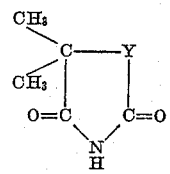

wherein Y is

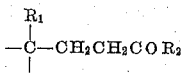

or

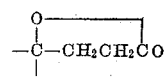

$R_1$ is H or OH, and $R_2$ is OH, $NH_2$ or alkoxy.

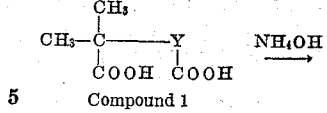

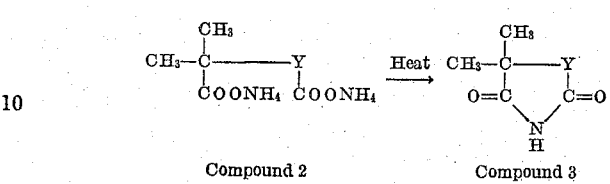

wherein Y has the significance above-defined. When Y stands for

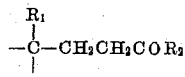

in the above formulae, $R_1$ being H and $R_2$ being OH, the starting material, which is a known compound, can be represented by the following formula:

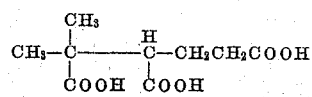

When Y stands for

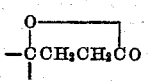

the starting material, 3-hydroxy-4-methylpentane-1,3,4-tricarboxylic acid lactone, can be prepared by reacting an alkyl isobutyrate (Compound 4 hereinbelow) as the enolate with a β-carbalkoxypropionyl halide (Compound 5) in the presence of a strong enolizing agent to form a dialkyl α,α-dimethyl-β-oxoadipate (Compound 6). The latter compound is reacted with hydrogen cyanide to produce a dialkyl 3-cyano-3-hydroxy-4-methylpentane-1,4-dicarboxylate (Compound 7) which is hydrolyzed under acidic conditions thereby forming the desired 3-hydroxy-4-methylpentane-1,3,4-tricarboxylic acid lactone (Compound 8). These reactions may be chemically represented as follows:

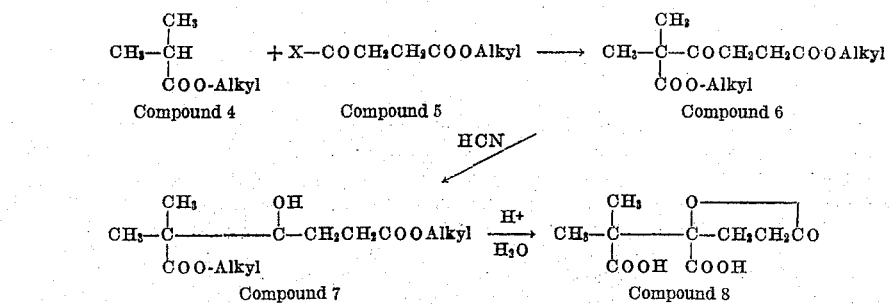

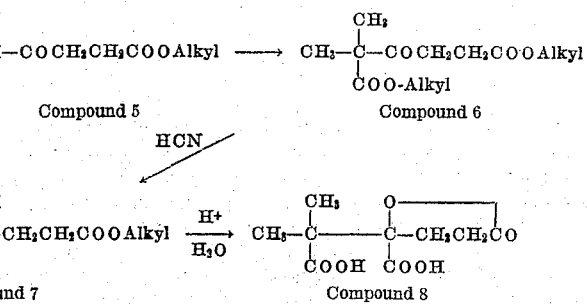

These 3,3-dimethyl-2,5-dioxo-pyrrolidine propionic acid compounds can be prepared by reacting a 4-methylpentane-1,3,4-tricarboxylic acid compound having free carboxyl groupings attached to the C-3 and C-4 carbon atoms (Compound 1 hereinbelow) with ammonium hydroxide and heating the resulting ammonium salt (Compound 2) to produce the corresponding 3,3-dimethyl-2,5-dioxo-pyrrolidine - 4 - propionic acid compound (Compound 3).

In accordance with this invention, the 4-methylpentane-1,3,4-tricarboxylic acid compound is dissolved in aqueous ammonium hydroxide solution containing preferably about one and less than two equivalents of aqueous ammonium hydroxide. The solution is heated to remove water and the residual anhydrous ammonium salt is heated under reduced pressure to a temperature above about 150° C. thereby forming the corresponding 3,3-dimethyl-2,5-dioxopyrrolidine-4-propionic acid compound which ordinarily distills at a temperature of about 165° C. at one millimeter pressure. The resulting oil can be crystallized from water or organic solvents.

The 4-methylpentane-1,3,4-tricarboxylic acid compounds utilized as starting materials in this procedure include 4-methylpentane-1,3,4-tricarboxylic acid, 1-carboalkoxy-4-methylpentane-3,4-dicarboxylic acid such as 1-carbomethoxy-4-methylpentane-3,4-dicarboxylic acid, 1-carboethoxy-4-methylpentane-3,4-dicarboxylic acid, 3-hydroxy-4-methylpentane-1,3,4-tricarboxylic acid, 1-carboalkoxy - 3 - hydroxy - 4-methylpentane-3,4-dicarboxylic acid such as 1-carbethoxy-3-hydroxy-4-methylpentane-3,4-dicarboxylic acid, 1-carbobutoxy-3-hydroxy-4-methylpentane-3,4-dicarboxylic acid, 3 hydroxy-4-methylpentane-1,3,4-tricarboxylic acid lactone, and the like. In accordance with the foregoing procedure these starting materials are converted to the corresponding ammonium salts which upon being heated under reduced pressure form the corresponding 3,3-dimethyl-2,5-dioxo-pyrrolidine-4-propionic acid compound as for example 3,3-dimethyl-2,5-dioxo pyrrolidine-4-propionic acid, an alkyl 3,3-dimethyl-2,5-dioxopyrrolidine-4-propionate such as methyl 3,3 - dimethyl - 2,5-dioxopyrrolidine-4-propionate, ethyl 3,3-dimethyl-2,5-dioxopyrrolidine-4-propionate, an alkyl 3,3-dimethyl-2,5-dioxo-4-hydroxypyrrolidine-4-propionate, such as ethyl 3,3-dimethyl-2,5-dioxo-4-hydroxypyrrolidine-4-propionate, butyl 3,3-dimethyl-2,5-dioxo-4-hydroxypyrrolidine-4-propionate, 3,3-dimethyl-2,5-dioxo-4-hydroxypyrrolidine-4-propionic acid lactone, and the like.

The over-all procedure utilized in preparing the 3-hydroxy-4-methylpentane-1,3,4-tricarboxylic acid starting materials is conducted as follows: the alkyl isobutyrate such as methyl isobutyrate, ethyl isobutyrate, butyl isobutyrate, and the like, in the form of its alkali metal enolate is brought into intimate contact with a β-carboalkoxypropionyl halide such as β - carbomethoxypropionyl chloride, β-carbethoxypropionyl chloride, β-carbobutoxypropionyl bromide, and the like, in solution in an organic solvent, preferably a dialkyl ether such as diethyl ether, in the presence of a strong enolizing agent such as triphenylmethylsodium preferably at a temperature within the range of about 20–30° C. Under these conditions the reaction is ordinarily complete in about ten minutes, and the product is conveniently recovered from the reaction mixture by acidification, washing the mixture with a weakly alkaline solution and water to remove the by-product metal halide, and distillation under reduced pressure to recover the corresponding dialkyl α,α-dimethyl-β-oxoadipate such a dimethyl α,α-dimethyl-β-oxoadipate, methyl ethyl α,α-dimethyl-β-oxoadipate, diethyl α,α-dimethyl-β-oxodipate, ethyl propyl α,α-dimethyl-β-oxoadipate, and the like.

The reaction between the dialkyl α,α-dimethyl-β-oxoadipate and the hydrogen cyanide is conveniently conducted by dissolving the adipic acid ester in anhydrous liquid hydrogen cyanide, cooling the resulting solution to a temperature of about 0 to 5° C. and adding to the resulting solution a small quantity, e. g. about 0.2% of a tertiary amine catalyst such as triethylamine. The resulting solution is maintained at a temperature of about 0 to 5° C. for a period of about two hours at which time the reaction is substantially complete. The resulting solution is allowed to warm to a temperature of about 20 to 25° C.; upon evaporation of the hydrogen cyanide there is obtained the corresponding dialkyl 3-cyano-3-hydroxy-4-methylpentane-1,4-dicarboxylate such as dimethyl 3-cyano-3-hydroxy-4-methylpentane-1,4-dicarboxylate, diethyl 3-cyano-3-hydroxy-4-methylpentane-1,4-dicarboxylate, methyl ethyl 3-cyano-3-hydroxy-4-methylpentane-1,4-dicarboxylate, dibutyl 3-cyano-3-hydroxy-4-methylpentane-1,4-dicarboxylate, and the like.

The dialkyl 3-cyano-3-hydroxy-4-methylpentane-1,4-dicarboxylate is not ordinarily isolated but, instead, the solution of this compound in liquid hydrogen cyanide is mixed with an excess of an aqueous mineral acid solution and the mixture allowed to warm to room temperature. The hydrolysis reaction which occurs is exothermic and some cooling is necessary to maintain the temperature of the mixture below about 30° C. After the reaction mixture has remained at room temperature for about three hours, additional water is added, the resulting solution is heated under reflux to complete the hydrolysis reaction, and the resulting solution is evaporated substantially to dryness under reduced pressure. The resulting crystalline residue is extracted with an organic solvent such as acetone, and the extracted material is crystallized from ether to give 3-hydroxy-4-methylpentane-1,3,4-tricarboxylic acid lactone which is obtained as a substantially pure crystalline material.

The following examples illustrate methods of carrying out the present invention, but it is to be understood that these examples are given for purposes of illustration and not of limitation.

Example 1

Two hundred and eighteen milligrams of 4-methylpentane-1,3,4-tricarboxylic acid is partially neutralized with one equivalent of aqueous ammonium hydroxide. The solution is evaporated to dryness and the residual ammonium salt is heated under reduced pressure. An oil distills at about 165° C./1 mm. This is dissolved in acetone, the solvent is evaporated, and the residual material is extracted with ether. The ether is concentrated by distillation until crystals are obtained, M. P. 130–135° C. Recrystallization from ether gives 3,3-dimethyl-2,5-dioxopyrrolidine-4-propionic acid melting at 140–142° C.

Example 2

One-half gram of 3-hydroxy-4-methylpentane-1,3,4-tricarboxylic acid lactone is dissolved in one to two equivalents of aqueous ammonium hydroxide. The solution is heated to remove the water. The residual ammonium salt is then heated under reduced pressure. A distillate is obtained at about 165° C./1 mm. Crystallization from water gives 0.27 g. of 3,3-dimethyl-2,5-dioxo-4-hydroxypyrrolidine-4-propionic acid lactone melting at 152–153° C.

*Analysis.*—Calcd. for $C_9H_{11}O_4N$: C, 54.81; H, 5.62; N, 7.10; Found: C, 54.60; H, 5.50; N, 7.21.

The 3 - hydroxy - 4-methylpentane-1,3,4-tricarboxylic acid lactone utilized as starting material in this example can be prepared as follows:

(a) Two and one-half liters of an ethereal solution containing 170 g. of triphenylmethylsodium is added to 77 g. of ethyl isobutyrate. After one-half hour, the solution, which has become much lighter in color, is added to 103 g. of β-carbethoxypropionyl chloride in 1.5 l. of anhydrous ether. The mixture is stirred in an atmosphere of nitrogen. The rate of addition is regulated so that the ether does not reflux. After the addition has been completed the mixture is stirred for an additional ten minutes. The mixture is then concentrated by distillation to about 1 l. The residue is washed twice with 5% acetic acid, twice with 10% sodium bicarbonate solution and finally with water. The ether solution is dried over magnesium sulfate. The solution is then concentrated and cooled. The triphenylmethane that separates is removed by filtration and washed with a small amount of cold ether. The filtrate is then concentrated and distilled under reduced pressure. The portion distilling at 105–138° C./3.5 mm. is redistilled using a six inch Vigreaux column giving 41 g. of diethyl α,α-dimethyl-β-oxoadipate, $n_D^{23°}$ 1.4353, which distills at 116° C./2 mm.

(b) Ten grams of diethyl α,α-dimethyl-β-oxoadipate is added to 35 ml. of anhydrous liquid hydrogen cyanide. The solution is cooled in an ice-bath and 0.1 ml. of triethylamine is added. The solution is kept in an ice-bath for two hours and then allowed to warm to 20–25° C. for ten minutes. The diethyl 3-cyano-3-hydroxy-4-methylpentane-1,4-dicarboxylate can be recovered by evaporation of the hydrogen cyanide. Instead of isolating the nitrile, however, the solution is hydrolyzed directly by the addition of 150 ml. of hydrochloric acid (sp. gr. 1.19) and allowing it to warm to room temperature. The reaction is exothermic and some cooling is necessary. A precipitate separates. After standing at room temperature for three hours, 150 ml. of water is added and the solution heated under reflux overnight. The solution is concentrated under reduced pressure. Two portions of water are added and evaporated to remove most of the hydrochloric acid. The crystalline residue is then extracted with three 200 ml. portions of refluxing acetone. The filtrates are combined and evaporated leaving 9.0 g. of an oil which solidifies. This is extracted with three 500 ml. portions of refluxing ether. The ether extracts are combined, filtered, and concentrated by distillation to about 50 ml. After cooling overnight at 0° C., the crystalline material is collected and purified by recrystallization to give substantially pure 3-hydroxy-4-methylpentane-1,3,4-tricarboxylic acid lactone; M. P. 166–167° C.

Various changes and modifications may be made in carrying out the present invention without departing from the sprit and scope thereof. Insofar as these changes and modifications are within the purview of the annexed claims, they are to be considered as part of our invention.

We claim:
1. The process which comprises reacting a lower alkyl isobutyrate in the form of its alkali metal enolate with a β-carboalkoxypropionyl halide in the presence of a strong enolizing agent to form the corresponding bis(lower alkyl) α,α-dimethyl-β-oxoadipate, reacting the latter compound with anhydrous hydrogen cyanide to form bis(lower alkyl) 3-cyano-3-hydroxy-4-methylpentane-1,4-dicarboxylate, and reacting said bis(lower alkyl) 3-cyano-3-hydroxy-4-methylpentane-1,4-dicarboxylate with an acidic hydrolyzing agent, thereby forming 3-hydroxy-4-methylpentane-1,3,4-tricarboxylic acid lactone.

2. The process which comprises reacting ethyl isobutyrate with β-carbethoxypropionyl chloride in the presence of triphenylmethylsodium to form diethyl α,α-dimethyl-β-oxoadipate, reacting the latter compound with anhydrous liquid hydrogen cyanide to produce diethyl 3-cyano-3-hydroxy-4-methylpentane - 1,4 - dicarboxylate, and reacting the latter compound with aqueous hydrochloric acid hydrolyzing agent to form 3-hydroxy-4-methylpentane-1,3,4-tricarboxylic acid lactone.

3. The process which comprises reacting a lower alkyl isobutyrate with a β-carboalkoxypropionyl halide in the presence of a strong enolizing agent to produce the corresponding bis (lower alkyl) α,α-dimethyl-β-oxoadipate.

4. The process which comprises reacting ethyl isobutyrate with β-carbethoxypropionyl chloride in the presence of triphenylmethylsodium to produce diethyl α,α-dimethyl-β-oxoadipate.

5. The process which comprises reacting bis(lower alkyl) α,α-dimethyl-β-oxoadipate with hydrogen cyanide to produce the corresponding bis(lower alkyl) 3-cyano-3-hydroxy-4-methylpentane-1,4-dicarboxylate.

6. The process which comprises reacting diethyl α,α-dimethyl-β-oxoadipate with anhydrous liquid hydrogen cyanide in the presence of triethylamine catalyst to produce diethyl 3-cyano-3-hydroxy-4-methylpentane-1,4-dicarboxylate.

7. The process which comprises reacting bis(lower alkyl) 3 - cyano - 3 - hydroxy-4-methylpentane-1,4-dicarboxylate with an acidic hydrolyzing agent, thereby forming 3-hydroxy-4-methylpentane-1,3,4-tricarboxylic acid lactone.

8. The process which comprises reacting diethyl 3-cyano-3-hydroxy-4-methylpentane - 1,4 - dicarboxylate with aqueous hydrochloric acid hydrolyzing agent, thereby forming 3-hydroxy-4-methylpentane - 1,3,4 - tricarboxylic acid lactone.

9. Dialkyl α,α-dimethyl-β-oxoadipate.
10. Diethyl α,α-dimethyl-β-oxoadipate.
11. Dialkyl 3-cyano-3-hydroxy-4-methylpentane - 1,4-dicarboxylate.
12. Diethyl 3-cyano-3-hydroxy-4-methylpentane - 1,4-dicarboxylate.
13. 3-hydroxy-4-methylpentane-1,3,4-tricarboxylic acid lactone.

References Cited in the file of this patent
UNITED STATES PATENTS

| | | |
|---|---|---|
| 1,285,248 | La Forge | Nov. 19, 1918 |
| 2,182,178 | Pinkernelle | Dec. 5, 1939 |

OTHER REFERENCES

Stoll: "Experimentia," vol. 4, p. 8 (1928).
Chem. and Met. Eng., February 1945, pp. 19–20.